Jan. 15, 1929. Re. 17,195

G. W. COMBS

MEANS FOR SUPPORTING AND CONTROLLING GYRATORY STRUCTURES

Original Filed Oct. 11, 1911

INVENTOR:
G. W. COMBS

BY Bruce S. Elliott
ATTORNEY.

Reissued Jan. 15, 1929.

Re. 17,195

UNITED STATES PATENT OFFICE.

GEORGE W. COMBS, DECEASED, LATE OF LEAVENWORTH, KANSAS, BY GREAT WESTERN MANUFACTURING COMPANY, ASSIGNEE, OF LEAVENWORTH, KANSAS.

MEANS FOR SUPPORTING AND CONTROLLING GYRATORY STRUCTURES.

Original No. 1,152,396, dated September 7, 1915, Serial No. 654,033, filed October 11, 1911. Application for reissue filed July 14, 1928. Serial No. 292,691.

This invention relates to improvements in means for supporting and controlling gyratory structures, and my object is to provide novel means of this character for use in connection with sifters employed in the separation of minerals, grain products, etc.

A further object is to provide apparatus of this character, which, while effective in operation, consists of but few, simple parts devoid of heavy castings to render the apparatus portable, so that it can be readily taken down, or moved from place to place.

In order that the invention may be fully understood, reference will now be made to the accompanying drawings, in which.

The device to be gyrated, in the present instance, is shown in the form of a sifter 1, suspended by a frame 2, provided at its lower end with a friction-clamp 3, in which the sifter is demountably secured, so that others of different mesh can be readily substituted therefor. Sifter 1 is supported, when clamp 3 is loose, through the intermediacy of a plurality of brackets 4, secured to the lower portion of said clamp.

Figure 1:
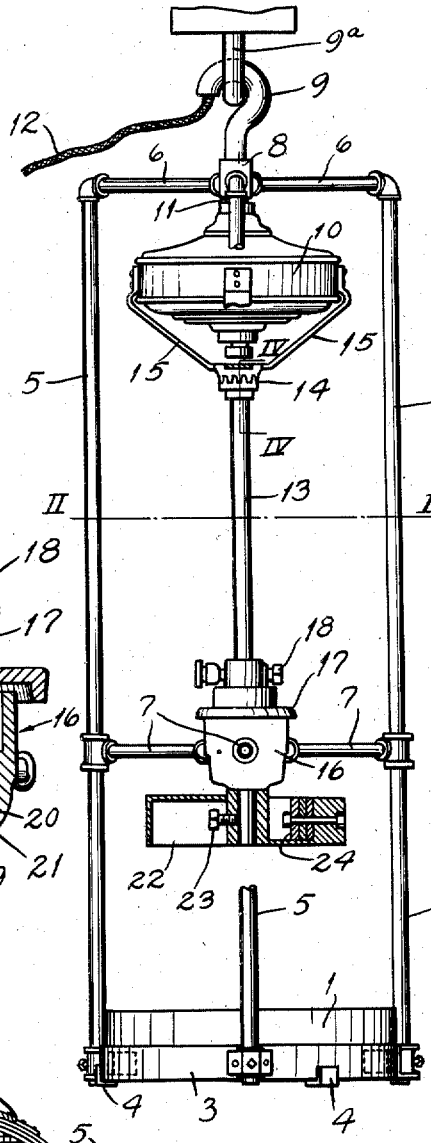
Figure 1 is a side elevation of a gyratory structure, with an embodiment of the invention adapted thereto.
Figure 3:
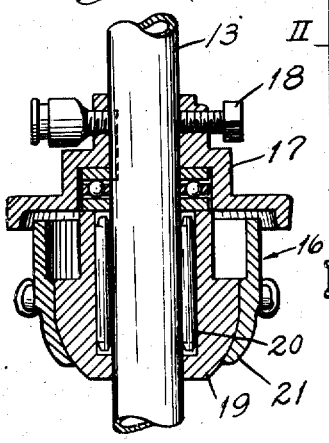
Figure 3 is an enlarged vertical section of a universal coupling employed in carrying out the invention.
Figure 4:
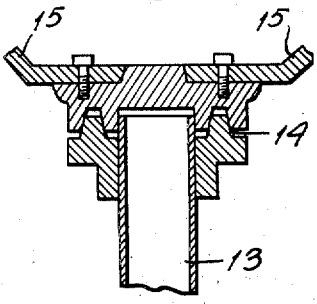
Figure 4 is an enlarged vertical section on line IV of Fig. 1, of a universal finger-coupling employed in carrying out the invention.
Figure 2:
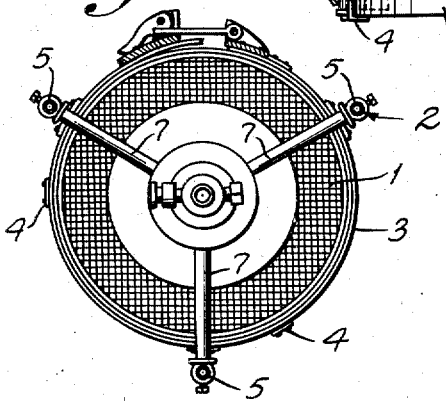
Figure 2 is a horizontal section on line II—II of Fig. 1.

Frame 2, in the present instance, comprises three equally spaced vertically arranged members 5, three radially disposed horizontal members 6 uniting the upper ends of members 5, three radially disposed horizontal members 7 uniting members 5 a suitable distance above the sifter 1, and a centrally disposed fitting 8 uniting the inner ends of the horizontal members 6 (see Fig. 1). The fitting 8 has an upwardly projecting tubular hook 9 whereby the entire apparatus may be removably supported from an overhead hook, or eye, $9^a$.

10 designates a driver consisting, in the present instance, of an electric motor suspended from the fitting 8 by a shaft 11 and deriving its current from a suitable source (not shown) over a flexible conductor 12, extending through the tubular hook 9 and the fitting 8, and communicating with said motor.

13 designates a centrally disposed vertically positioned shaft yieldingly connected to the driver 10 through the intermediacy of a universal finger coupling 14, having a plurality of arms 15 extending outward and upward and secured to the periphery of the driver 10. This universal finger coupling 14, while acting positively as a transmitter of rotary motion from driver 10 to the shaft 13, is sufficiently flexible to permit the shaft 13 to remain in a vertical position, should the driver 10 for any reason leave its true horizontal position.

Shaft 13 is journaled in an anti-friction ball-and-socket bearing 16, it being supported in proper relation to said bearing by a cap 17, secured to the shaft by a set-screw 18. This type of bearing prevents binding of the shaft therein, should said shaft for any reason leave a parallel position with members 5 of the frame 2. The self-adjusting member 19 of bearing 16 has anti-friction rollers 20 with which shaft 13 has contact, and the stationary socket member 21 of said bearing is fixedly secured to the horizontal members 7 of frame 2.

22 designates an unbalancing member secured to the lower terminal of shaft 13 by a set-screw 23, and provided at one side with removable weights 24, whereby one side of said member is made heavier than the other, so that it will impart a gyratory motion to the apparatus when said member 22 is rotated.

The operation briefly stated, is as follows: When the driver 10 is in motion it drives the shaft 13, which in turn rotates the unbalancing member 22. Said unbalancing member 22, by reason of being heavier on its weighted side, moves in an orbit, or gyrates when rotated, and in turn gyrates frame 2 and the sifter 1. While frame 2 is free to move laterally in any direction, or gyrate, it is prevented from rotating with shaft 13 by the opposite sides of hook 9 contacting with the opposite sides of the hook or other supporting means 9[a].

What is claimed is:

1. The combination with a sifter, suspending means therefor capable of lateral movement in any direction, means not engaging said sifter but supported by said suspending means to impart gyratory motion to the sifter, and a self-contained motor supported by the suspending means and operably connected to said gyratory means.

2. The combination with a sifter, suspending means therefor capable of lateral movement, a driven shaft independent of the sifter but mounted in said suspending means, and means fixed to said shaft to impart gyratory motion thereto.

3. The combination with a gyratory sifter, suspending means therefor capable of lateral movement, a drive shaft rotatable independently of said suspending means, and a self-adjusting bearing carrying said drive shaft and supported by the suspending means.

4. The combination with a gyratory sifter, suspending means therefor capable of orbital movement, a driver independent of the sifter and mounted on said suspending means, and a drive shaft independent of the sifter and yieldingly connected to said driver and the suspending means.

5. The combination with a sifter, suspending means therefor capable of orbital movement, a drive shaft independent of the sifter and journaled in the suspending means, means mounted on said shaft to impart gyratory motion thereto, and means to prevent the suspending means from rotating with the drive shaft.

6. In combination, a portable gyratory structure comprising a vertical frame suspended from a single point for lateral movement in any direction, means on said frame for gyrating it, and a container supported by said frame to gyrate therewith.

7. In combination, a portable gyratory structure comprising a vertical frame, a centrally disposed hook on said frame to freely support the same so that it may move laterally in any direction, means mounted on the frame for gyrating it, and a container supported by said frame to gyrate therewith.

8. In combination, a frame suspended from a single point for lateral movement in any direction, a shaft mounted in said frame and supported thereby, means on said shaft to gyrate the frame, and a container supported by said frame to gyrate therewith.

9. The combination with a gyratory sifter, suspending means therefor capable of lateral movement in any direction, a self-adjusting bearing carried by said suspending means, a driven shaft journaled in said self-adjusting bearing, said shaft being independent of the gyratory sifter, and an eccentric weight on said shaft to impart gyratory motion thereto.

10. In combination, a gyratory sifter, suspending means therefor capable of lateral movement in any direction, a self-adjusting bearing carried by said suspending means, a shaft journaled in said bearing, means on said shaft to impart gyratory motion to the suspending means, a motor mounted in the suspending means, and a yielding connection between said motor and the shaft whereby the latter is driven by the former.

11. In combination, a freely swinging frame, a sieve mounted therein, a motor mounted on said frame, and means actuated by said motor to impart motion to the frame.

12. In combination, a container free to move laterally in any direction, a single support for said container capable of securing the latter from axial rotation, and a motor on said support for actuating it.

13. A machine of the class described comprising a structure suspended from a single point for swinging movement in any direction, a sifter mounted on said structure, and means on said structure for gyrating said sifter.

14. A machine of the class described comprising a structure suspended from a single point for swinging movement in any direction, a sifter mounted on the lower end of said structure, and means on said structure for gyrating said sifter.

15. A machine of the class described comprising a structure having means thereon at its upper end for suspending the structure from a single point, said means being capable of preventing axial rotation of the structure when suspended, a sifter mounted at the bottom of the structure, and means on the structure for gyrating said sifter.

16. A machine of the class described comprising a portable structure having means at its upper end for removably suspending the same at a single point and operating to prevent axial rotation of the structure when suspended, a sifter mounted on the lower end of said structure, and means on said structure for gyrating said sifter.

17. A portable self-contained machine comprising a frame provided at its upper end with a single suspension means capable of preventing axial rotation thereof when suspended, a sifter, actuating means for gyrating said sifter, and a motor mounted on the frame for driving said actuating means.

18. A portable gyratory machine of the class described comprising a frame, a sifter, and an actuating motor, the entire weight of the machine being supported from a single point about which the machine as a unit gyrates.

In testimony whereof, the name of the said GEORGE W. COMBS has been signed hereto by Great Western Manufacturing Company, assignee of the entire right, title, and interest of the said GEORGE W. COMBS.

GEORGE W. COMBS,
*Deceased.*

By GREAT WESTERN MANUFACTURING COMPANY,
*Assignee.*

SAMUEL H. WILSON,
*President.*